United States Patent
Caine et al.

(10) Patent No.: US 9,537,802 B2
(45) Date of Patent: Jan. 3, 2017

(54) SHAREABLE FAVORITES SETS

(71) Applicants: John Caine, Fairfield, CT (US);
Jonathan P. Taylor, Ridgefield, CT (US)

(72) Inventors: John Caine, Fairfield, CT (US);
Jonathan P. Taylor, Ridgefield, CT (US)

(73) Assignee: priceline.com LLC, Norwalk, CT (US)

( * ) Notice: Subject to any disclaimer, the term of this patent is extended or adjusted under 35 U.S.C. 154(b) by 533 days.

(21) Appl. No.: 13/765,581

(22) Filed: Feb. 12, 2013

(65) Prior Publication Data
US 2014/0229854 A1 Aug. 14, 2014

(51) Int. Cl.
*G06Q 30/06* (2012.01)
*H04L 12/58* (2006.01)
*G06F 3/0486* (2013.01)

(52) U.S. Cl.
CPC ........... *H04L 51/08* (2013.01); *G06Q 30/0643* (2013.01); *G06F 3/0486* (2013.01)

(58) Field of Classification Search
CPC ... G06F 17/30973; G06Q 10/02; G06Q 30/02; G06Q 30/06; G06Q 30/0601; G06Q 30/0613; G06Q 30/0621; G06Q 30/0633; G06Q 30/0635; G06Q 30/0643; H04L 51/04; H04L 65/00; H04L 67/00; H04L 12/1813; H04L 12/581; H04M 3/42; H04M 7/1205; H04N 7/00
(Continued)

(56) References Cited

U.S. PATENT DOCUMENTS 5,664,110 A 9/1997 Green et al.
5,724,520 A 3/1998 Goheen
(Continued)

OTHER PUBLICATIONS

Copy-paste stops working on Windows 7—Super User (published on May 25, 2010) http://superuser.com/questions/145268/copy-paste-stops-working-on-windows-7.*
(Continued)

*Primary Examiner* — Jeffrey A Gaffin
*Assistant Examiner* — Rinna Yi
(74) *Attorney, Agent, or Firm* — Hickman Palermo Becker Bingham LLP

(57) ABSTRACT

In an embodiment, a data processing method comprises generating and displaying, on a computing device, a graphical user interface comprising a plurality of item summary tiles and a set of favorites buckets, wherein each of the item summary tiles graphically displays a plurality of attributes of a different items, wherein the set of favorites buckets is displayed in a fixed position adjacent to the item summary tiles; receiving first input specifying adding a particular item among the different items to the set of favorites buckets and, in response thereto, storing data identifying the particular item in storage associated with the set of favorites buckets and displaying a graphical representation of the particular item in an available one of the favorites buckets; receiving second input specifying sharing the set of favorites buckets and, in response thereto, automatically creating an electronic mail message having a message body that comprises a plurality of hyperlinks, wherein each of the hyperlinks identifies an online description of a different one of the items of one of the favorites buckets.

16 Claims, 7 Drawing Sheets

(58) Field of Classification Search
USPC .... 715/723, 738, 752, 764, 810, 863; 705/5, 705/7.29, 26.1, 26.2, 26.81, 27.2
See application file for complete search history.

(56) References Cited

U.S. PATENT DOCUMENTS

| | | | |
|---|---|---|---|
| 5,987,440 A | 11/1999 | O'Neil et al. | |
| 6,087,956 A | 7/2000 | Helferich | |
| 6,094,640 A | 7/2000 | Goheen | |
| 6,097,941 A | 8/2000 | Helferich | |
| 6,233,430 B1 | 5/2001 | Helferich | |
| 6,253,061 B1 | 6/2001 | Helferich | |
| 6,259,892 B1 | 7/2001 | Helferich | |
| 6,459,360 B1 | 10/2002 | Helferich | |
| 6,462,646 B2 | 10/2002 | Helferich | |
| 6,636,733 B1 | 10/2003 | Helferich | |
| 6,687,741 B1 * | 2/2004 | Ramaley et al. | 709/206 |
| 6,696,921 B2 | 2/2004 | Helferich | |
| 6,826,407 B1 | 11/2004 | Helferich | |
| 6,983,138 B1 | 1/2006 | Helferich | |
| 7,003,304 B1 | 2/2006 | Helferich | |
| 7,039,428 B1 | 5/2006 | Helferich | |
| 7,146,157 B2 | 12/2006 | Helferich | |
| 7,155,241 B2 | 12/2006 | Helferich | |
| 7,242,951 B2 | 7/2007 | Helferich | |
| 7,277,716 B2 | 10/2007 | Helferich | |
| 7,280,838 B2 | 10/2007 | Helferich | |
| 7,376,432 B2 | 5/2008 | Helferich | |
| 7,403,787 B2 | 7/2008 | Helferich | |
| 7,627,305 B2 | 12/2009 | Helferich | |
| 7,835,757 B2 | 11/2010 | Helferich | |
| 7,843,314 B2 | 11/2010 | Helferich | |
| 7,957,695 B2 | 6/2011 | Helferich | |
| 8,099,046 B2 | 1/2012 | Helferich | |
| 8,107,601 B2 | 1/2012 | Helferich | |
| 8,116,741 B2 | 2/2012 | Helferich | |
| 8,116,743 B2 | 2/2012 | Helferich | |
| 8,134,450 B2 | 3/2012 | Helferich | |
| 8,195,569 B2 | 6/2012 | O'Neil et al. | |
| 8,224,294 B2 | 7/2012 | Helferich | |
| 8,295,450 B2 | 10/2012 | Helferich | |
| 8,355,702 B2 | 1/2013 | Helferich | |
| 8,374,585 B2 | 2/2013 | Helferich | |
| 8,719,251 B1 * | 5/2014 | English et al. | 707/713 |
| 2009/0265255 A1 * | 10/2009 | Jackson et al. | 705/27 |
| 2009/0307318 A1 * | 12/2009 | Chappell | G06Q 10/109 709/206 |
| 2010/0281351 A1 * | 11/2010 | Mohammed | 715/205 |
| 2011/0119712 A1 * | 5/2011 | Choi et al. | 725/46 |
| 2012/0078731 A1 * | 3/2012 | Linevsky et al. | 705/14.73 |
| 2012/0253896 A1 * | 10/2012 | Killoran et al. | 705/14.4 |
| 2013/0275896 A1 * | 10/2013 | Takeda | 715/764 |
| 2014/0222588 A1 * | 8/2014 | Ozaki | 705/14.71 |

OTHER PUBLICATIONS

Hotels.com Makes Travel Booking More Social With Introduction of Deals Facebook App (published Jul. 16, 2012) http://www.multivu.com/mnr/52875-hotelsdotcom-deals-facebook-app-social-travel-recommendations.*

* cited by examiner

SHAREABLE FAVORITES SETS

TECHNICAL FIELD

The present disclosure generally relates to data processing. The disclosure relates more specifically to organizing and sharing information in the graphical user interface of a computing device with a touch-sensitive display.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Data processing systems commonly offer the capability to search for items in a database and display result sets of items that match a particular search query. In some systems, users can designate an item as a favorite item or an item in a wish list. However, presently known systems do not provide easy-to-use mechanisms to share the contents of a favorites list or a wish list with others who are not using the same data processing system. In some systems, when a first user wishes to share her favorites list or wish list with a second person, the second person is required to log in to an instance of the same data processing system or online service. Typically the second user must have a pre-existing account with the service or on the system. Consequently, sharing the lists is cumbersome and may involve an excessive number of steps for the second person.

Still other systems represent items in a wish list or favorites list using text labels, text descriptions, or hyperlinks that are within a web page containing many other elements. In the context of mobile computing devices such as tablet computers, interacting with these types of lists is difficult because a large number of information elements are displayed for each list item. In addition, visualizing the entire list may be difficult.

SUMMARY OF THE INVENTION

The appended claims may serve as a summary of the invention.

DETAILED DESCRIPTION OF EXAMPLE EMBODIMENTS

Figure 1:
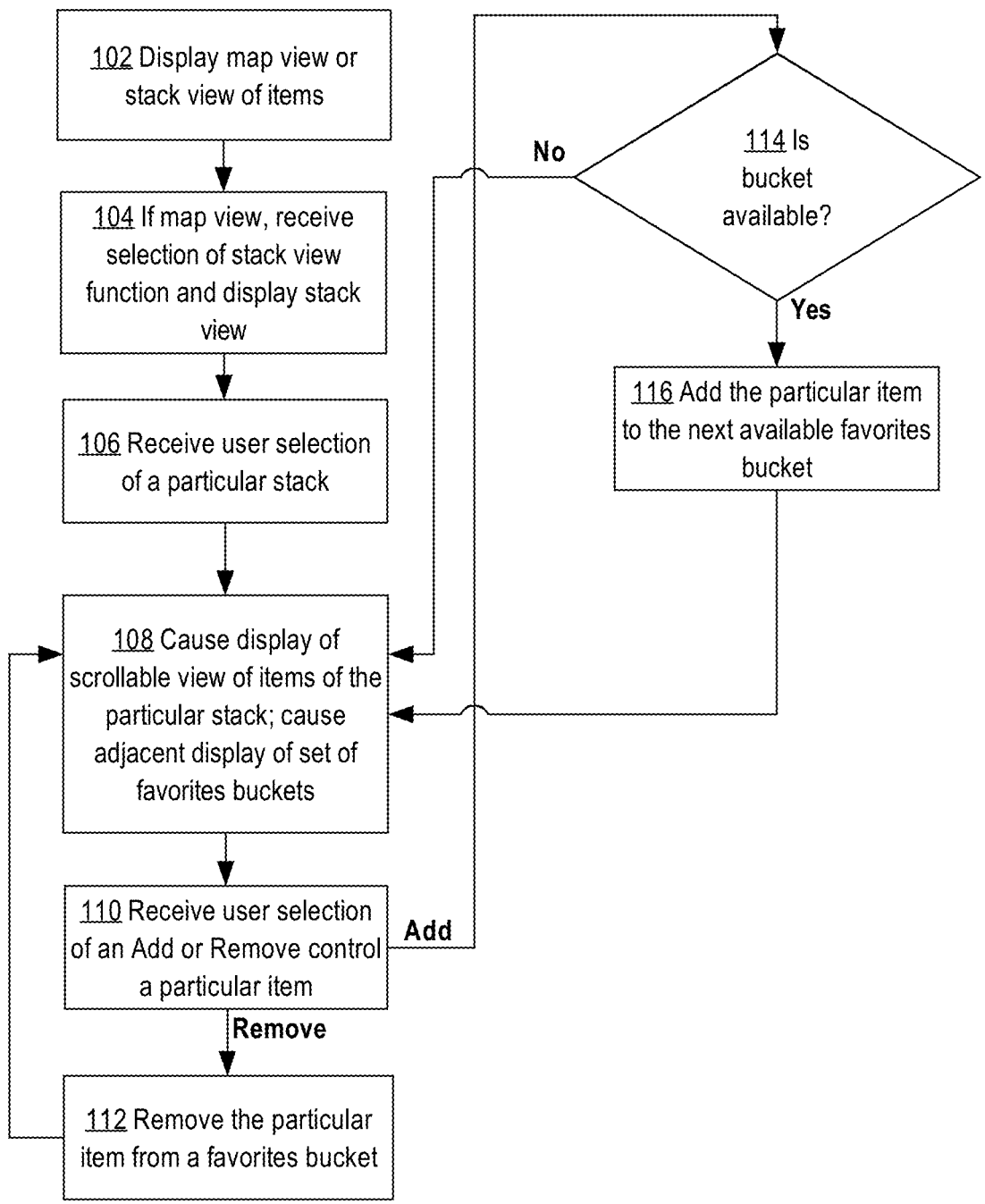
FIG. 1 is a flow diagram illustrating an example process of managing a set of favorites buckets.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1. General Overview

In an embodiment, a data processing method comprises generating and displaying, on a computing device, a graphical user interface comprising a plurality of item summary tiles and a set of favorites buckets, wherein each of the item summary tiles graphically displays a plurality of attributes of a different items, wherein the set of favorites buckets is displayed in a fixed position adjacent to the item summary tiles; receiving first input specifying adding a particular item among the different items to the set of favorites buckets and, in response thereto, storing data identifying the particular item in storage associated with the set of favorites buckets and displaying a graphical representation of the particular item in an available one of the favorites buckets; receiving second input specifying sharing the set of favorites buckets and, in response thereto, automatically creating an electronic mail message having a message body that comprises a plurality of hyperlinks, wherein each of the hyperlinks identifies an online description of a different one of the items of one of the favorites buckets; wherein the method is performed by one or more computing devices.

In an embodiment, the method further comprises, in response to the second input, automatically attaching, to the electronic mail message, an electronic document that comprises descriptions of the items that are in any of the favorites buckets.

In an embodiment, the method further comprises, in response to the second input: receiving user input specifying a method of sharing; automatically creating and sending, to a printer that is coupled to the computing device, a printable electronic document or page that comprises descriptions of the items that are in any of the favorites buckets.

In various embodiments, the items are descriptions of physical properties or descriptions of hotels.

In an embodiment, the method further comprises scrolling the plurality of item summary tiles, in response to an input gesture specifying moving one of the item summary tiles, without changing a display of the set of favorites buckets.

In an embodiment, the particular item is associated with a plurality of stored images relating to the item, and the method further comprises displaying a first image relating to the particular item within a particular item summary tile for that particular item; scrolling the first image and displaying one or more other images among the plurality of stored images relating to the item in response to an input gesture without changing a remainder of the particular item summary tile or the set of favorites buckets.

In an embodiment, the method further comprises not responding to the input when none of the favorites buckets is available.

2. Structural & Functional Overview

FIG. 1 is a flow diagram illustrating an example process of managing a set of favorites buckets. The process of FIG.

1 may be implemented, for example, using one or more computer programs, scripts, or other software elements that are hosted on or executed by a computing device having a graphical display unit. As one example, the process of FIG. 1 may be implemented as a computer program application or "app" that is installed in and executes with a mobile computing device, such as a laptop computer, smartphone, or tablet computer. Embodiments may use touch-sensitive displays for receiving user input to select various elements or signal particular functions, as further described. The process of FIG. 1 presumes that the computing device has initiated operation of the app.

The computing device may be coupled directly or indirectly via one or more networks or internetworks to a server computer that executes server-side computer programs that implement an item search, viewing, and purchase or booking service. For example, some of the processes herein may be implemented using programs, scripts, and other software elements at a server computer that provide an online service that is accessible using browsers or apps that are compatible with a network communication protocol such as HTTP. The server computer may be implemented as any number of distributed, clustered, or redundant server machines for load balancing or capacity purposes and may be coupled to one or more databases that store item data for a large number of items.

In an embodiment, at block 102, either a map view or stack view of items is displayed. For purposes of illustrating clear examples, the description herein assumes that the items are physical properties, such as hotels. Thus, FIG. 1 may be implemented in the context of a hotel search and booking app that enables the computing device to search for, evaluate, select, and complete reservations or bookings for hotels. In other embodiments, the items may be any of accommodations other than hotels; airline flights; rental cars; restaurants; or any other commodity of commerce, product or service. In some embodiments, prior to executing FIG. 1, the computing device obtains location information based on a wired or wireless networking connection, GPS receiver, or other transceiver that can communicate or determine a location of the computing device. In these embodiments, the location information may be used to automatically generate a graphical map on the graphical display unit, such as a map showing available hotels or other items that are near to the computing device.

In block 104, if the map view is displayed, then the process receives a selection of a stack view function and, in response, displays a stack view of items. Alternatively, if location information is unavailable, then the stack view may be displayed initially or as a default choice. Further, in some embodiments the operation of the app may be customized on a per-user basis to specify whether the map view or the stack view is the initial view when the app launches.

Figure 2:
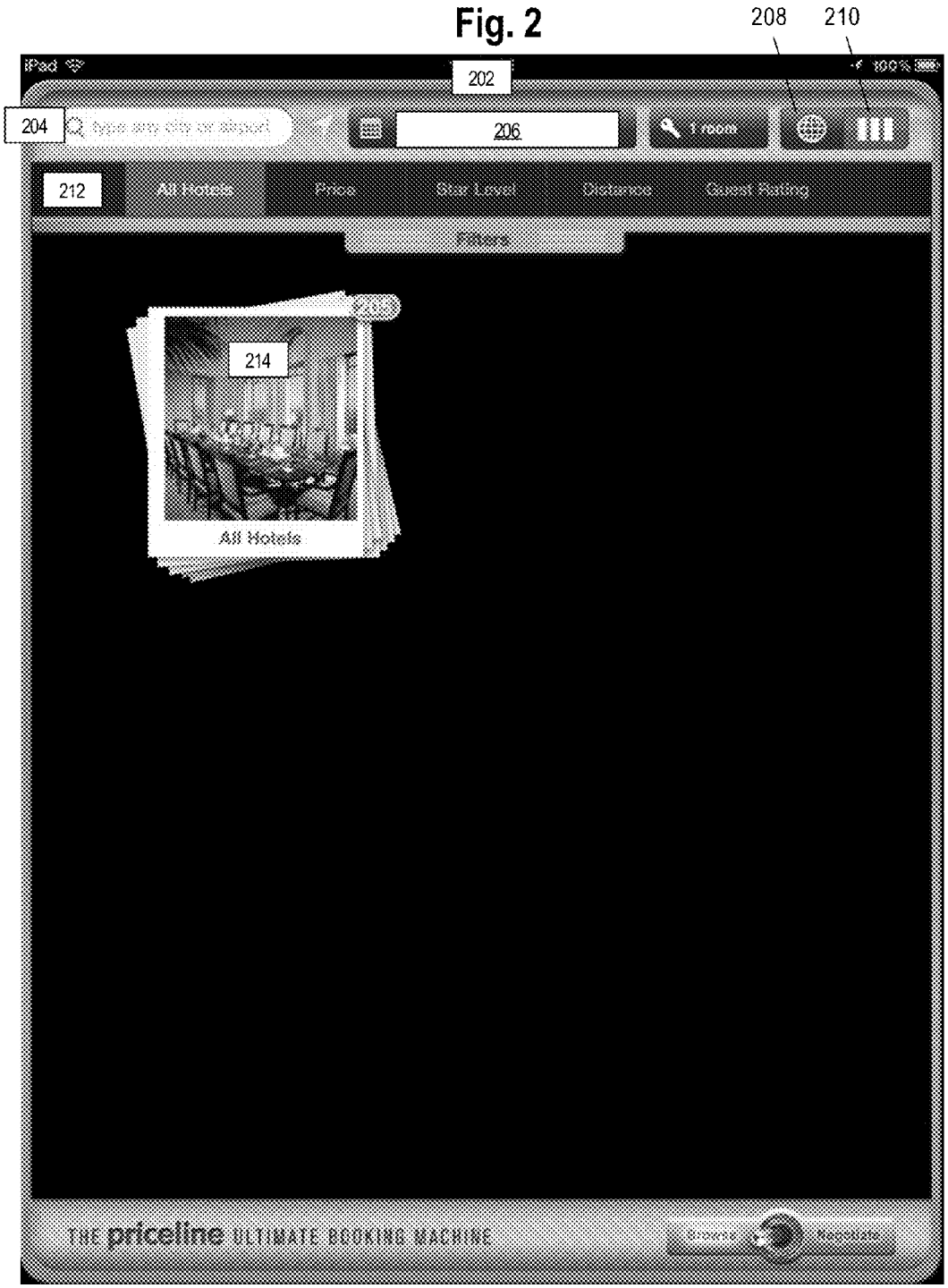
FIG. 2 illustrates a graphical user interface for a mobile computing device including a property stack.

FIG. 2 illustrates a graphical user interface for a mobile computing device including a property stack. For purposes of illustrating a clear example, FIG. 1 and other processes described herein may be described in connection with the specific GUI examples shown in FIG. 2, FIG. 3, FIG. 4, FIG. 5, FIG. 6. However, other embodiments may use other specific GUI implementations and therefore the drawing figures do not limit the scope of the disclosure but simply illustrate particular possible examples. In FIG. 2, a graphical user interface 202 comprises a search box 204, date field 206, map view control 208, stack view control 210, filter bar 212, and one or more item stacks 214. In an embodiment, search box 204 is associated with program code that is configured to receive a search query and to search a database for item descriptions that match the search query. Example search queries include city name and airport names, when the items are hotels; for other items, other kinds of queries may be supported. The date field 206 may be configured to display a date for which available items are sought. For example, by default the date field 206 indicates a hotel night stay for check-in on the night of the current day and check-out the next day; selecting the date field enables the user to specify stays of other lengths. When the items are other than hotels, selecting the date field 206 may trigger a user input dialog for other date criteria appropriate to the items. For example, if the items are restaurants, then the date field 206 could accept a date and hour.

In an embodiment, map view control 208 and stack view control 210 are configured to accept user input to toggle the user interface 202 between the stack view of FIG. 2 and a map view in which items are displayed on a graphical map. In one embodiment, controls 208, 210 are elements of a single control that toggles between the views when any region of the controls is tapped. In an embodiment, filter bar 212 is configured to indicate whether a particular filter has been applied to the items in the stack 214. In FIG. 2, the active filter is All Hotels and therefore stack 214 includes all hotels among the items in the stack. Note that the icon with the value "205" indicates that the item stack 214 includes two hundred five items and "205" is not a drawing reference numeral. In this embodiment, selecting any one of the other filter identifiers, such as Price, Star Level, Distance, or Guest Rating, causes redisplaying the items of stack 214 in a plurality of other stacks organized in sub-groups according to criteria appropriate for the selected filter. For example, selecting the Price filter identifier might cause the All Hotels stack 214 to be replaced with a plurality of stacks each labeled as "Under $50," "$50-$100," "$100-$150," "$150-200," "$200-$250," "$250-$300,", and labeled with the number of items that match the label of a particular one of the stacks.

Referring again to FIG. 1, in block 106, a user selection of a particular stack is received. The user selection may comprise tapping on, clicking on or otherwise indicating selection of a particular stack such as stack 214 of FIG. 2.

Figure 3:
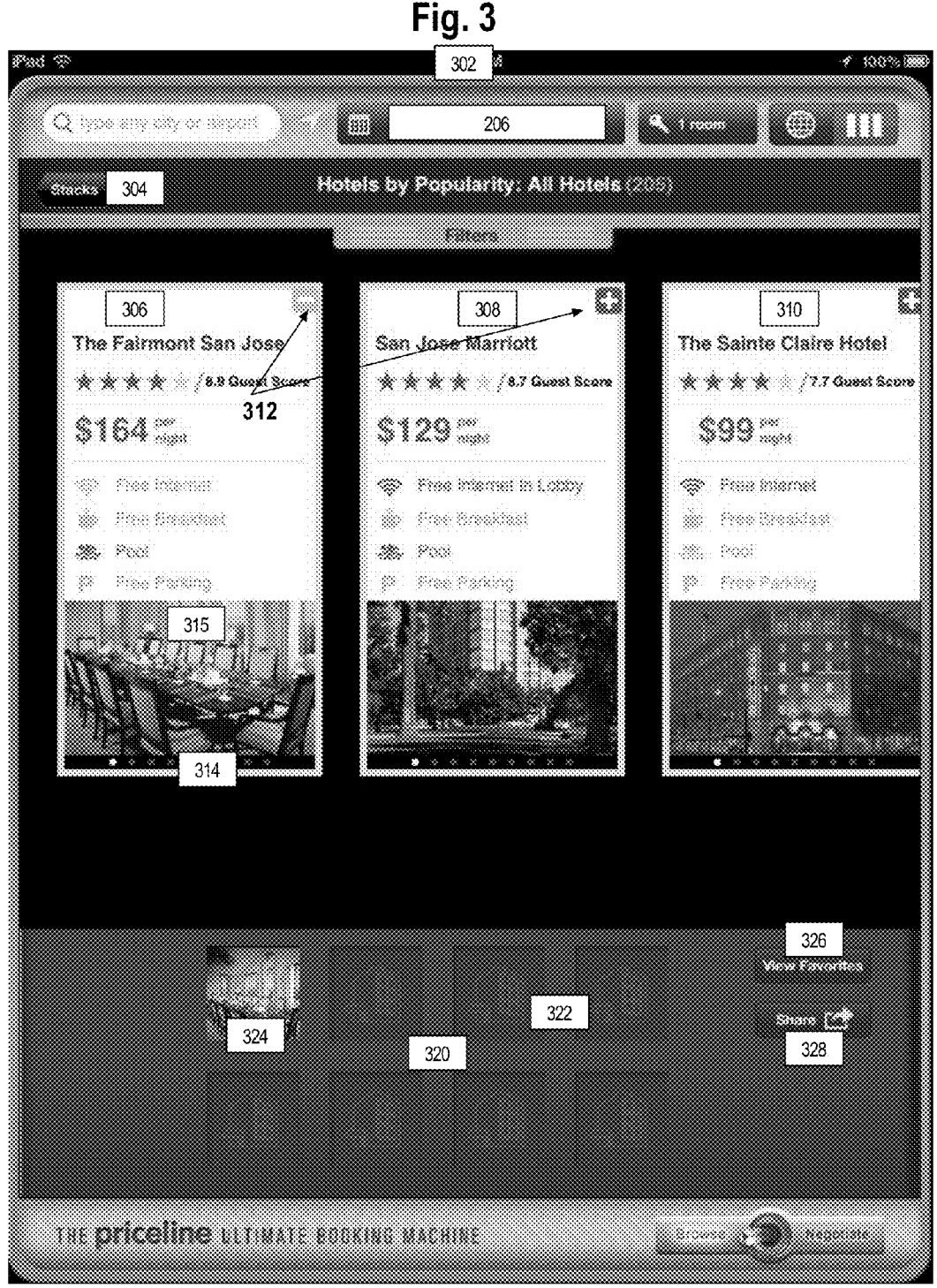
FIG. 3 illustrates a graphical user interface for a mobile computing device including a set of favorites buckets and property summaries.

In block 108, the process causes displaying a scrollable and modifiable view of the items that are in the particular selected stack and causes displaying a set of favorites buckets adjacent to the scrollable view. As an example, FIG. 3 illustrates a graphical user interface for a mobile computing device including a set of favorites buckets and property summaries that may be displayed as a result of block 108. In an embodiment, a graphical user interface 302 comprises a plurality of item summary tiles 306, 308, 310 and a set 320 of favorites buckets 322. Each of the item summary tiles 306, 308, 310 graphically displays a plurality of attributes of a different item. For example, when the items are hotels, attributes may include hotel name, guest score, price per night, amenities, and graphical images. Each of the item summary tiles 306, 308, 310 also includes an Add-Delete control 312, which may comprise a context-sensitive icon that is responsive to selection by a touch gesture or mouse click. In the example of FIG. 3, set 320 includes a first bucket 324 among the buckets 322 that has an item in that bucket.

In an embodiment, the set 320 of favorites buckets 322 is displayed in a fixed position of the GUI 302 adjacent to the item summary tiles 306, 308, 310. In contrast, the item summary tiles 306, 308, 310 form a scrollable list that may move from left to right in the GUI 302 in response to generally linear touch gestures or other user input. In this example, the list is linearly scrollable but other forms of scrolling, movement or gestures may be used. Thus, although the All Hotels stack contains "205" items as previously described for the example of FIG. 2, FIG. 3, the GUI 302 illustrates three (3) item summary tiles 306, 308, 310 corresponding to three (3) of the items among the "205" items in the All Hotels stack. However, other item summary tiles for other items in the stack may be viewed by applying a generally linear, side-to-side touch gesture on any of the displayed item summary tiles 306, 308, 310. In response, the item summary tiles 306, 308, 310 graphically move linearly sideways and other item summary tiles for other items in the stack 214 are displayed.

Further, in an embodiment, the user may re-order any of the item summary tiles 306, 308, 310 by selecting a particular item summary tile and using a touch gesture to indicate a new position in the list. For example, the process may be configured to detect a user tapping once on and holding down touch on a particular item summary tile, and may respond by enabling movement of the particular item summary tile; the user could then re-order the particular item summary tile by dragging it to a new position in the list and releasing the touch gesture. These gestures may be implemented using program code that is configured to change the ordinal position or ordinal tag, in an internal data structure or stored file, associated with the items in response to the changes in position.

In an embodiment, each of the item summary tiles 306, 308, 310 is associated with a plurality of stored images relating to the item of that particular item summary tile. For example, item summary tile 306 includes a graphic image 315 and a scroll indicator 314 comprising a set of adjacent circles in which one circle is highlighted; the set of adjacent circles indicates that a plurality of other graphic images are associated with the particular item summary tile. In an embodiment, each item summary tile 306, 308, 310 is configured to respond to a linear touch gesture or other selection of the graphic image 315 by scrolling the first image and displaying one or more other images among the plurality of stored images relating to the item without changing a remainder of the particular item summary tile 306 or the set 320 of favorites buckets 322. Thus, the graphic image 315 and other graphic images of an item summary title are scrollable within the region shown for the first graphic image, independent of the remainder of the particular item summary tile. Further the item summary tiles 306, 308, 310 are scrollable as a list independent of the set 320 of favorites buckets 322.

At block 110, the process receives a user selection of an Add or Remove control for a particular property. For example, the process receives user input specifying adding a particular item among the different items of the stack to the set of favorites buckets. User input may comprise tapping on or otherwise selecting the Add-Delete control 312. In other embodiments, the user input may comprise a different touch gesture such as dragging a particular item toward the set 320 or toward one of the buckets 322. In an embodiment, when a particular item is in the set 320 of favorites buckets 322, the Add-Delete control 312 indicates a removal option using a character such as "–". In converse when a particular item is not in the set 320 of favorites buckets 322, the Add-Delete control indicates an addition option using a character such as "+".

When the Add-Delete control 312 indicates the addition option and is selected, in response, at block 114 the process determines whether one of the buckets 322 is available to receive an item. If so, then in block 116 the process adds the particular item to the next available one of the buckets 322 in the set 320. For example, the process stores data identifying the particular item in storage associated with the set 320 of favorites buckets 322 and displays a graphical representation of the particular item in a next available one of the favorites buckets. The storage may comprise a list of item identifiers that are stored in a specified system file in the filesystem of the host computer.

Alternatively, the list of item identifiers may be communicated to a server computer to which the host computer is coupled via a network. When server-side storage is used, embodiments may enable redisplaying a particular user's favorites buckets 322 on a different computer used by the same user than the one on which the favorites items were originally identified and placed into the buckets. For example, the particular user's favorites buckets 322 could be shown in the user interface of a desktop web-based application that supports searching, viewing and purchasing items or related products and services, after the user has logged in to the service using appropriate user credentials.

As seen in FIG. 3, the item of item tile 306 is represented in a first bucket 324 among the buckets 322 using a thumbnail image that is similar to graphical image 315 of that item tile. Using a thumbnail image that is based on or similar to the main image of an item tile provides a visible suggestion to the user about which item is represented in the set 320 of favorites buckets 322 in a form that is compact, simple and clear.

If a particular item is already in one of the buckets 322, then the Add-Delete control 312 indicates the removal option. If the removal option is selected, then in block 112, the particular item is removed from the favorites bucket with which it is associated. For example, the graphical image thumbnail in the buckets 322 is removed and a blank bucket graphic is redisplayed in its place, and data identifying the specified item is removed from storage. Selecting the removal option may comprise tapping on the Add-Delete control 312, touching once and holding down on the item to be removed, or other gestures.

Figure 4:
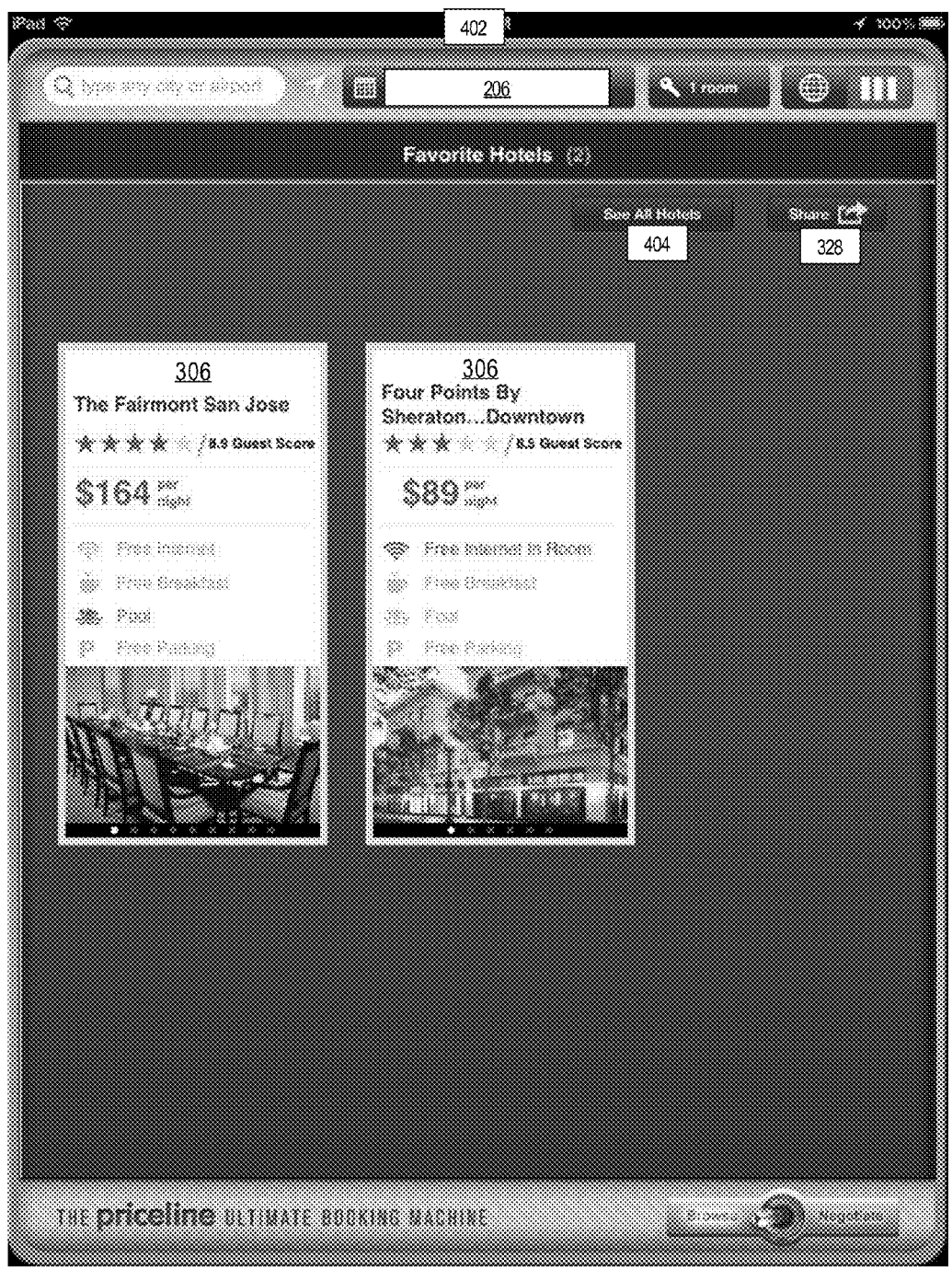
FIG. 4 illustrates a graphical user interface for a mobile computing device including a set of summaries of favorite properties.
Figure 5:
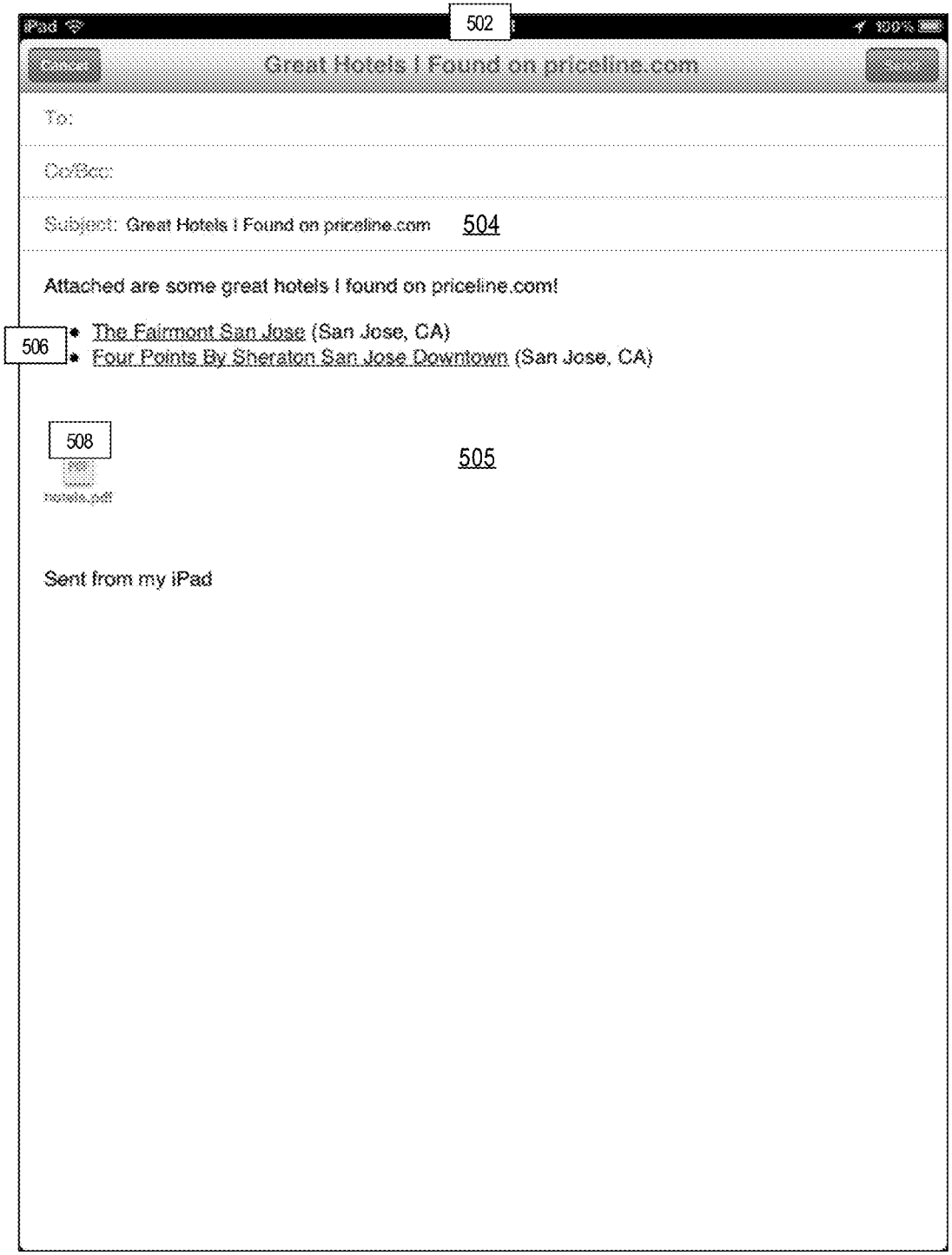
FIG. 5 illustrates an example electronic mail message identifying favorite properties.
Figure 6:
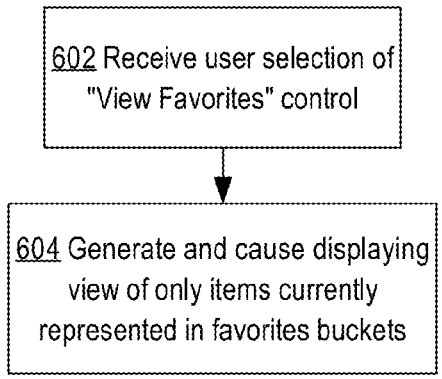
FIG. 6 illustrates an example process of generating the display of FIG. 4.
Figure 7:
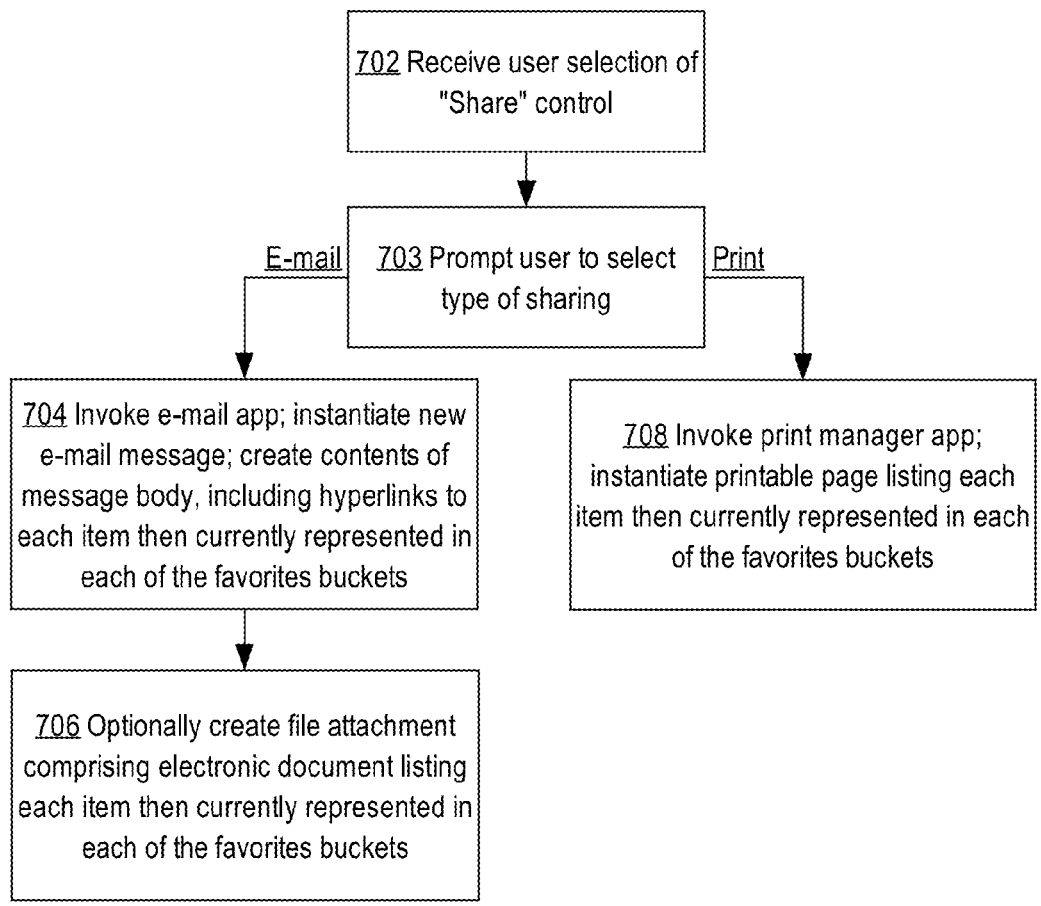
FIG. 7 illustrates an example process of sharing properties that are identified in the set of favorites buckets.

In an embodiment, GUI 302 further comprises a View Favorites control 326 and a Share Favorites control 328 that are configured to facilitate viewing and sharing items that are represented in the set 320 of favorites buckets 322. FIG. 4 illustrates a graphical user interface for a mobile computing device including a set of summaries of favorite properties. FIG. 5 illustrates an example electronic mail message identifying favorite properties. FIG. 6 illustrates an example process of generating the display of FIG. 4. FIG. 7 illustrates an example process of sharing properties that are identified in the set of favorites buckets. Referring first to FIG. 6, in an embodiment, at block 602, a user selection of the View Favorites control 326 is received and in block 604, the user selection causes the process to generate and cause displaying a view of only items that are currently represented in one or more of the buckets 322 of set 320. For example, as shown in FIG. 4, the process generates a graphical user interface 402 comprising a plurality of different item tiles 306 that correspond to items that are graphically represented in buckets 322 of set 320. In an embodiment, the GUI 402 includes item tiles 306 for only those buckets 322 that have items associated with them. When many items are in the buckets 322, the item tiles 306 of GUI 402 may comprise a scrollable set of item tiles. This approach enables the user to rapidly view and compare attributes of a subset of items from among all the items in a stack without having to view all the items in the stack.

Further, in an embodiment, the user may re-order any of the item summary tiles 306 in the favorites list view by selecting a particular item summary tile and using a touch gesture to indicate a new position in the list. For example, the process may be configured to detect a user tapping once on and holding down touch on a particular item summary tile, and may respond by enabling movement of the particular item summary tile; the user could then re-order the particular item summary tile by dragging it to a new position in the list and releasing the touch gesture. These gestures may be implemented using program code that is configured to change the ordinal position or ordinal tag, in an internal data structure or stored file, associated with the items in response to the changes in position.

The GUI 402 may include a See All Hotels (or Items) control 404, and a Share Favorites control 328 of the type shown in FIG. 3. In an embodiment, user selection of the See All Hotels control 404 causes the process to re-display GUI 302 of FIG. 3. Thus, the See All Hotels control 404 intuitively serves as a "back" control to return the view in the GUI to the previous state.

Referring now to FIG. 7, in an embodiment, at block 702, a process receives input specifying sharing the set of favorites buckets. For example, user input selecting the Share Favorites control 328 is received from GUI 302 of FIG. 3 or GUI 402 of FIG. 4. In one embodiment, items shown in the buckets 322 of set 320 may be shared with others via e-mail or by printing. Therefore, in an embodiment, in block 703 the process prompts the user to select a type of sharing from among e-mail sharing or print sharing; the prompt may involve generating and causing displaying a pop-up dialog that requests the user to select one of the sharing mechanisms.

Blocks 704, 706 illustrate example process steps when input to the prompt indicates that e-mail sharing is selected. In an embodiment, the process invokes an e-mail app that has been previously installed on the computing device on which the process is running. The process automatically creates or instantiates a new e-mail message having a message body that comprises a plurality of hyperlinks, in which each of the hyperlinks identifies an online description of a different one of the items of one of the favorites buckets. Optionally, the process automatically attaches, to the electronic mail message, an electronic document or electronic file that comprises descriptions of the items that are in any of the favorites buckets.

FIG. 5 illustrates an example e-mail message that may be created in an embodiment. In this example, e-mail 502 comprises a Subject line 504 that includes text representative of the content of the message; the text can promote the service provider that supports the processes described herein. E-mail 502 further comprises a message body 505 that comprises a plurality of hyperlinks 506 in which each of the hyperlinks corresponds to a different one of the items that were in the buckets 322 of the set 320 at the time that the e-mail sharing control was selected. The format of the hyperlinks is not critical. In an embodiment, each hyperlink identifies an item and indicates a location of the item, and the target URL of the hyperlink is an item description at a server computer location of the service provider that provides or supports the processes that are described herein.

Optionally, the message body 505 may comprise a file attachment 508 that contains graphical representations of the items that are indicated using the hyperlinks. For example, the file attachment may comprise reproductions of the item tiles 306, or may comprise complete, detailed information about each of the items in a format different than that of the item tiles 306, or information in another format. Example information includes item name, address, and copies of a plurality of images that illustrate the item. In an embodiment, the file attachment 508 is created in ADOBE PDF format, which has a relatively compact format so that relatively little storage space is needed to contain a rich, complex document or set of documents or pages for each of the items.

Referring again to FIG. 7, at block 708, if the print sharing option is selected, then in one embodiment the process invokes a print manager app that has been previously installed on the user's computing device and instantiates or creates a printable electronic document or page listing each item that is then currently represented in each of the favorites buckets. For example, the printable document may be similar to those that are created for the file attachment 508 of FIG. 5. In some embodiments, the same code base may be used for producing the file attachment 508 and the printable pages that are generated at block 708. The printable pages may be spooled automatically to an attached printer or a user dialog may be displayed to prompt the user to select a particular printer to which the printable pages are then directed.

In another embodiment, sharing items in the favorites view may be performed using an invitation process with which a first user may invite a second user of the same service to have access to the first user's favorite list. In this embodiment, favorites list data may be stored on a server computer that hosts the service in association with user account data for each of the first user and the second user. The server computer may implement program code that is configured to establish a relationship of the first user's account to the second user's account in response to an invitation communicated by the first user and an acceptance by the second user. When such a relationship exists, the server computer may be configured to provide the second user, on the second user's computer, with a display of items that are represented in a favorites list of the first user's account. In some embodiments, the server computer may be configured to enable storing a copy of the first user's favorites list in local storage on the second user's computer. Additionally or alternatively, the server computer may be configured to push updated favorites list data associated with the first user to the second user's computer.

In another embodiment, each of the favorites buckets 322 in set 320 may be associated with a rank or user preference value that is stored in association with item identifying information in that favorites bucket. The rank or user preference value may indicate an express or implied order ascribed by the user to the items. For example, in FIG. 3, the first favorites bucket 324 may have an implied rank of "1", but in other embodiments the processes herein may implement functions that enable a user to expressly assign a different rank to a particular favorites bucket. For example, the favorites bucket 324 could have a rank of "3" assigned to it, even though it appears at the far left in the set 320; alternatively, express assignment of rank values to buckets 322 could result in automatic reordering and redisplaying of the buckets in the set 320 according to the express rank values.

Ranking items in the favorites buckets 322 may be combined, in an embodiment, with a multi-user sharing approach so that different users may share their ranks of favorite items, and receive and display data indicating a rank of the same item or items by associated users or friends. For example, in one embodiment, the set 320 of favorites buckets 322 for each user of the service is stored in the database in association with account data identifying that user's account, or a relatively unique identifier of that user's primary computer, such as the advertisingIdentifier under APPLE IOS 6.0. Each of the buckets 322 may be associated with a stored rank value and when another user requests viewing the favorites buckets of a first user with which a relationship has been established as previously described, the rank values ascribed by the first user are also displayed. Alternatively, when a first user is displaying that user's own buckets 322 of favorite items, the rank value ascribed by a second user is displayed adjacent top a particular bucket with user identifying information; for example, a particular one of the buckets 322 of user Mark could include a message stating "No. 3 Favorite of Jennifer", where the computers or accounts of Mark and Jennifer have a previously established association or relationship at the server computer.

3. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
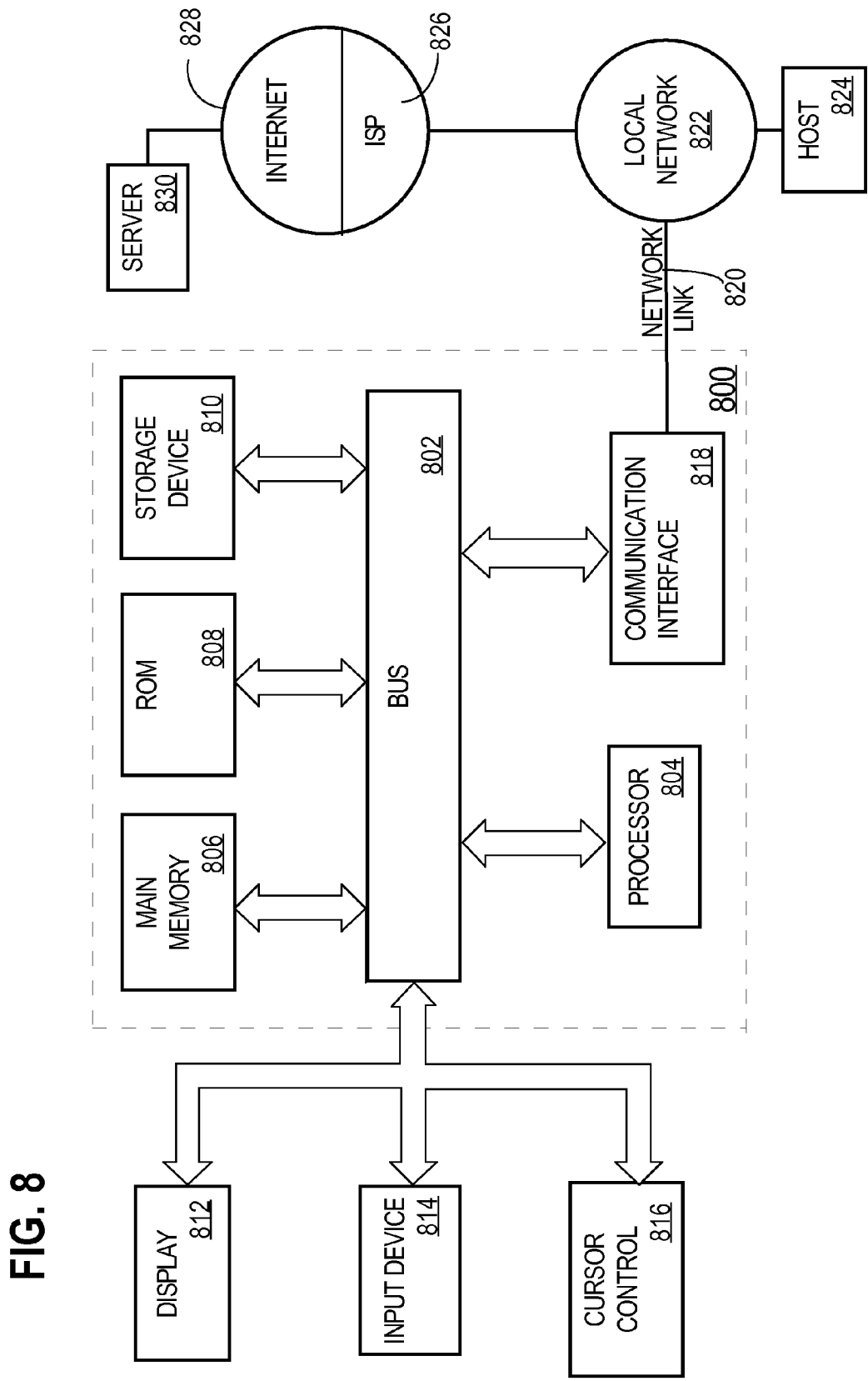
FIG. 8 illustrates an example computer system with which embodiments may be used.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   generating and displaying, on a computing device, a graphical user interface comprising a plurality of item summary tiles and a set of favorites buckets, wherein each of the item summary tiles graphically displays a plurality of attributes of a different item, wherein the set of favorites buckets is displayed in a fixed position adjacent to the item summary tiles;
   wherein the set of favorites buckets contains a finite set of two or more separate, spaced apart rectangles where no more than one item summary tile of the item summary tiles can be dragged into each rectangle of the two or more rectangles;
   receiving first input specifying adding a particular item among the different items to one of the rectangles of the set of favorites buckets and, in response thereto, storing data identifying the particular item in storage associated with the set of favorites buckets and displaying a graphical representation of the particular item comprising a graphical image thumbnail of an image included in the item summary tile corresponding to the particular item in an available one of the set of favorites buckets;
   receiving second input specifying sharing the set of favorites buckets and, in response thereto, automatically creating an electronic mail message having a message body that comprises a plurality of hyperlinks, wherein each of the plurality of hyperlinks identifies a uniform resource locator (URL) of an online description of a different one of the items of one of the set of favorites buckets;
   wherein the method is performed by one or more computing devices.

2. The method of claim 1, further comprising, in response to the second input, automatically attaching, to the electronic mail message, an electronic document that comprises descriptions of the items that are in any of the set of favorites buckets.

3. The method of claim 1, further comprising, in response to the second input:
   receiving user input specifying a method of sharing;
   automatically creating and sending, to a printer that is coupled to the computing device, a printable electronic document that comprises descriptions of the items that are in any of the set of favorites buckets.

4. The method of claim 1 wherein the items are descriptions of physical properties.

5. The method of claim 1 wherein the items are descriptions of hotels.

6. The method of claim 1, further comprising scrolling the plurality of item summary tiles, in response to an input gesture specifying linearly moving one of the item summary tiles, without changing a display of the set of favorites buckets.

7. The method of claim 1, wherein the particular item is associated with a plurality of stored images relating to the item, and further comprising:
   displaying a first image relating to the particular item within a particular item summary tile for that particular item;
   linearly scrolling the first image and displaying one or more other images among the plurality of stored images relating to the item in response to an input gesture without changing a remainder of the particular item summary tile or the set of favorites buckets.

8. The method of claim 1 further comprising not responding to the first input when none of the set of favorites buckets is available.

9. One or more non-transitory storage media storing instructions which, when executed by one or more computing devices, cause performing:
   generating and displaying, on a computing device, a graphical user interface comprising a plurality of item summary tiles and a set of favorites buckets, wherein each of the item summary tiles graphically displays a plurality of attributes of a different item, wherein the set of favorites buckets is displayed in a fixed position adjacent to the item summary tiles;
   wherein the set of favorites buckets contains a finite set of two or more separate, spaced apart rectangles where no more than one item summary tile of the item summary tiles can be dragged into each rectangle of the two or more rectangles;
   receiving first input specifying adding a particular item among the different items to one of the rectangles of the set of favorites buckets and, in response thereto, storing data identifying the particular item in storage associated with the set of favorites buckets and displaying a graphical representation of the particular item comprising a graphical image thumbnail of an image included in the item summary tile corresponding to the particular item in an available one of the set of favorites buckets;

receiving second input specifying sharing the set of favorites buckets and, in response thereto, automatically creating an electronic mail message having a message body that comprises a plurality of hyperlinks, wherein each of the plurality of hyperlinks identifies an online description of a different one of the items of one of the set of favorites buckets.

10. The storage media of claim 9, further comprising, instructions which, when executed by one or more computing devices, cause in response to the second input, automatically attaching, to the electronic mail message, an electronic document that comprises descriptions of the items that are in any of the set of favorites buckets.

11. The storage media of claim 9, further comprising instructions which, when executed by one or more computing devices, cause in response to the second input:
   receiving user input specifying a method of sharing;
   automatically creating and sending, to a printer that is coupled to the computing device, a printable electronic document that comprises descriptions of the items that are in any of the set of favorites buckets.

12. The storage media of claim 9 wherein the items are descriptions of physical properties.

13. The storage media of claim 9 wherein the items are descriptions of hotels.

14. The storage media of claim 9, further comprising instructions which, when executed by one or more computing devices, cause scrolling the plurality of item summary tiles, in response to an input gesture specifying linearly moving one of the item summary tiles, without changing a display of the set of favorites buckets.

15. The storage media of claim 9, wherein the particular item is associated with a plurality of stored images relating to the item, and further comprising instructions which, when executed by one or more computing devices, cause:
   displaying a first image relating to the particular item within a particular item summary tile for that particular item;
   linearly scrolling the first image and displaying one or more other images among the plurality of stored images relating to the item in response to an input gesture without changing a remainder of the particular item summary tile or the set of favorites buckets.

16. The storage media of claim 9 further comprising instructions which, when executed by one or more computing devices, cause not responding to the first input when none of the set of favorites buckets is available.

* * * * *